US005772365A

United States Patent [19]
Vogel et al.

[11] Patent Number: 5,772,365
[45] Date of Patent: Jun. 30, 1998

[54] INSERT FOR BALL NOSE END MILL

[75] Inventors: Scott W. Vogel, Raleigh, N.C.; Robert L. Shomaker, Little Rock, Ark.

[73] Assignee: Kennametal Inc., Latrobe, Pa.

[21] Appl. No.: 712,242

[22] Filed: Sep. 12, 1996

Related U.S. Application Data

[63] Continuation of Ser. No. 411,031, Mar. 27, 1995, Pat. No. 5,562,370.

[51] Int. Cl.⁶ .................................................. B23C 5/14
[52] U.S. Cl. .............................. 407/42; 407/114; 407/116
[58] Field of Search ............................ 407/42, 114, 115, 407/116

[56] References Cited

U.S. PATENT DOCUMENTS

| | | | |
|---|---|---|---|
| 4,132,493 | 1/1979 | Hosoi | 407/53 |
| 4,273,480 | 6/1981 | Shirai et al. | 407/114 |
| 4,280,774 | 7/1981 | Hayama | 407/36 |
| 4,527,930 | 7/1985 | Harroun | 407/42 |
| 4,588,332 | 5/1986 | Komanduri et al. | 407/114 |
| 4,623,285 | 11/1986 | Costil | 407/41 |
| 4,626,140 | 12/1986 | Zweekly et al. | 407/114 |
| 4,693,641 | 9/1987 | Tsujimura et al. | 407/42 |
| 4,898,499 | 2/1990 | Tsujimura et al. | 407/42 |
| 4,936,719 | 6/1990 | Peters | 407/42 |
| 5,044,840 | 9/1991 | Fouquer et al. | 407/116 X |
| 5,188,487 | 2/1993 | Okawa et al. | 407/34 |
| 5,203,649 | 4/1993 | Katbi et al. | 407/116 X |
| 5,294,219 | 3/1994 | Shiratori et al. | 407/34 |
| 5,562,370 | 10/1996 | Vogel et al. | 407/42 |

FOREIGN PATENT DOCUMENTS

| | | |
|---|---|---|
| 0046511 | 3/1982 | European Pat. Off. . |
| 0307563 | 3/1989 | European Pat. Off. . |
| 0364421 | 4/1990 | European Pat. Off. . |
| 0404744 | 12/1990 | European Pat. Off. . |
| 05040608 | 9/1992 | European Pat. Off. . |
| 2431897 | 2/1980 | France . |
| 4118070 | 12/1992 | Germany . |
| 4241140 | 6/1994 | Germany . |
| 404141304 | 5/1992 | Japan ..................................... 407/114 |
| WO9311898 | 6/1993 | WIPO . |
| WO9525618 | 9/1995 | WIPO . |

OTHER PUBLICATIONS

International Search Report for PCT/US96/01512.

*Primary Examiner*—A. L. Pitts
*Assistant Examiner*—Henry W. H. Tsai
*Attorney, Agent, or Firm*—John M. Vasuta

[57] ABSTRACT

An insert for use in a ball nose end mill is provided that includes an insert body having a top wall, a bottom wall, and at least one arcuate side wall. An arcuate cutting edge is defined at an intersection between the top and side walls that includes a plurality of sinusoidal undulations for reducing cutting forces, and vibration, and enhancing the breaking and removal of chips removed from a workpiece during a cutting operation. An end portion of the insert crosses the axis of rotation when the insert is mounted in the seat of an end mill body, and the undulations reduce the considerable shear forces applied to the cutting edge at this location. The cutting edge has a profile which follows the contour of a sphere to permit machining a rounded cut. The side wall of the insert body includes an upper relief portion disposed directly under the cutting edge, with a relief angle for preventing the undulations from making unwanted striations or tool marks in the sidewalls of the rounded cut.

19 Claims, 4 Drawing Sheets

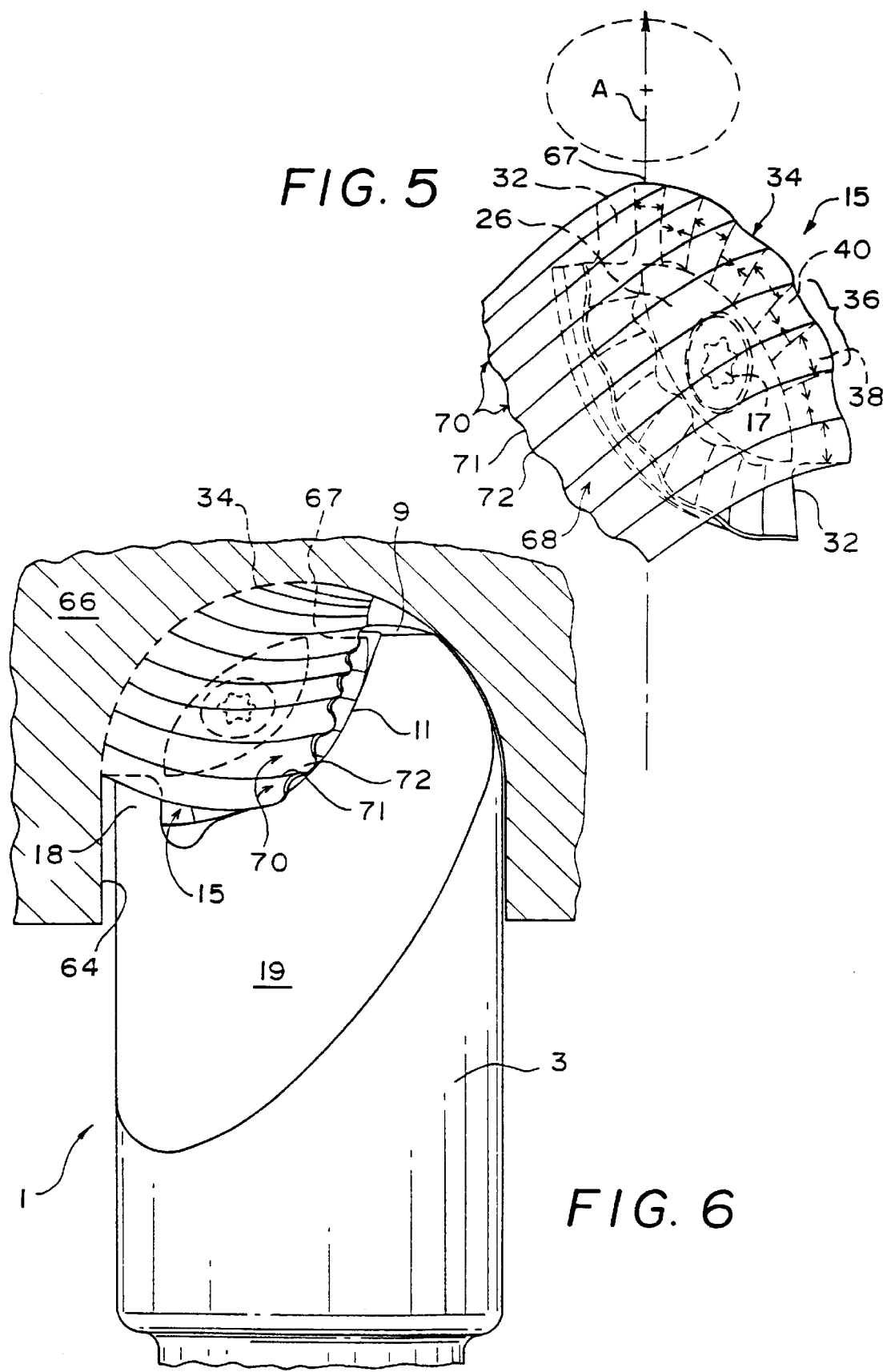

INSERT FOR BALL NOSE END MILL

This application is a continuation of application Ser. No. 08/411,031 filed on Mar. 27, 1995, now U.S. Pat. No. 5,562,370.

BACKGROUND OF THE INVENTION

This invention generally relates to an insert for a ball nose end mill, and is specifically concerned with such an insert having sinusoidal undulations along its cutting edge for reducing cutting forces and vibration and facilitating the breaking and removal of chips.

Inserts for ball nose end mills are well known in the prior art. Such inserts typically comprise an integral body formed from a hard, wear resistant material having at least one arcuate cutting surface that may be quadrant-shaped. The end mill itself includes an elongated cylindrical body having a shank portion for attachment to a turning tool, and a hemispherically-shaped end having a quadrant-shaped seat for receiving and mounting the insert. The portion of the cutting edge nearest the tip of the hemispherically-shaped end crosses over the axis of rotation of the end mill a short distance to insure that the cutting edge of the insert engages the workpiece along the axis of rotation of the end mill body, thus allowing the end mill to perform a plunge operation in a workpiece.

Such ball nose end mills have proven to be highly versatile machine tools that are capable of performing plunge-type cutting much like a drill, or face-type milling like a conventional milling head, or even ramp-type machine operations that combine the motions of both plunge and face-type cutting. However, the applicants have noted a number of shortcomings in the performance of the insert used with such end mills where performance could be substantially improved. For example, the applicants have noted that the region of the cutting edge that intersects the axis of rotation is subjected to large amounts of heat-generating shear forces since the rotational speed of the edge is zero at the axis, and very slow in the portion of the edge adjacent to the axis. Some insert designers have attempted to solve this problem by shaping the cutting edge so that it falls short of traversing the axis of rotation. Unfortunately, such a design necessarily creates a small protrusion of uncut workpiece material at the point where the axis of rotation of the end mill body intersects the workpiece. While the unwanted protrusion of uncut material is periodically broken off due to the forces applied to it by the cutting operation, a small rough spot along the axis of rotation can be created on the surface of the cut.

Still other shortcomings include the relatively higher cutting forces and vibrations associated with the use of a prior art ball nose end mill versus the use of a more conventional (but unfortunately less versatile) milling cutter. The applicants have observed that one of the causes of such higher cutting forces and vibration is that all points of the cutting edge of the inserts used in such end mills orthogonally engage the workpiece at all times during the cutting operation. While it is possible to reduce the cutting forces and vibrations by mounting the insert at an angle with respect to the axis of rotation of the cutter body (thereby imparting an axial rake angle to the insert), such a technique requires the provision of relatively deep insert seats, which in turn weakens the body of the cutter. Additionally, such a tilted mounting of the insert can produce an unwanted concavity in the sidewalls of the cut made by the end mill, thus creating a distortion in the shape of the cut when a true hemispherical profile is desired.

Finally, the applicants have noted that some inserts for such ball nose cutters do not effectively embrittle the metal chips that result from certain cutting operations. Hence, if such a cutter is used to implement a fine-cut plunge operation in a highly ductile material, the insert used in the cutter may not effectively embrittle the resulting foil like chips, which can interfere with their expulsion from the chip-expelling flute of the cutter body and thus interfere with the cutting operation.

Clearly there is a need for an insert for use in a ball nose end mill that is capable of producing rounded cuts in a workpiece without the generation of large stresses and frictional heat where the cutting edge intersects the center line of the cutter. Ideally, such a cutter should be able to cut a workpiece with lower cutting forces and with less vibration than the inserts of the prior art without the need for tilting the insert at a substantial axial rake angle, thereby reducing power requirements while increasing tool longevity. Finally, it would be desirable if such an insert were capable of imparting substantial embrittling forces to the chips resulting from a cutting operation so that even very thin chips formed from highly ductile metals will curl and break into small pieces during a cutting operation.

SUMMARY OF THE INVENTION

The invention is an insert for use in a ball nose end mill that overcomes or ameliorates all of the aforementioned shortcomings associated with prior art inserts.

The insert of the invention generally comprises an insert body having a top surface, a bottom surface, and at least one arcuate side surface, and at least one arcuate cutting edge defined at the intersection between the top and side surfaces that includes a plurality of sinusoidal undulations. The undulations advantageously reduce both the cutting forces and vibration associated with the operation of the insert without the need for canting the insert at an axial rake angle that would weaken the toolholder, and further enhance the curling, breaking, and removal of the metal chips produced by cutting.

The insert is particularly adapted for use in an end mill body rotatable about an axis that has a shank portion at one end for attaching the mill body to a turning tool, and an insert seat at its other end for mounting the insert such that an end portion of the arcuate cutting edge rotates about the axis of rotation. The profile of the cutting edge is arcuate, and designed to make a hemispherically-shaped cut when rotated by an end mill body. A portion of the arcuate cutting edge crosses over the axis of rotation of the end mill body. The undulations further serve to advantageously reduce the substantial shear forces that are generated in the portion of the cutting edge that traverses the axis of rotation.

The side surface of the insert includes a lower relief portion that terminates along the bottom surface of the insert body, and an upper relief portion that terminates at the undulating cutting edge. The upper relief portion is blended between the undulating cutting edge and the lower relief portion to provide at least a minimum relief angle with the workpiece. Such a combination allows the undulating cutting edge to make accurately rounded cuts whose walls are substantially free of unwanted striations or other undesirable tool mark patterns.

The top surface of the insert body includes a land portion disposed behind the cutting edge for strengthening the edge. In the preferred embodiment, the land portion is inclined between 5° and 10° with respect to the plane of the top surface to impart a positive rake angle to the edge, which also helps to reduce cutting forces.

The top surface of the insert body also includes a chip curling groove disposed behind the land portion having rounded bottom, front, and rear walls, the end portions of the front and rear walls being inclined between about 15° and 30° with respect to the plane of the top surface. The width of the chip curling groove is about five times the height between the lower most point of the trough and uppermost point of the crest of each of the undulations. Such dimensioning, in combination with the positive rake angle imparted to the cutting edge by the land portion, applies substantial curling forces to chips produced by the cutting edge, which in turn tends to work-harden them. Additionally, the crest and trough portions of each of the undulations alternately apply tensile and compressive forces to such chips, which tend to further work-harden them by pleating them. The combination of the curling and pleating forces results in substantial chip embrittlement, which in turn causes the chips to readily break into small pieces which are easily expelled from the vicinity of the cutting operation by the chip removing flutes in the mill.

BRIEF DESCRIPTION OF THE SEVERAL FIGURES

Figure 1:
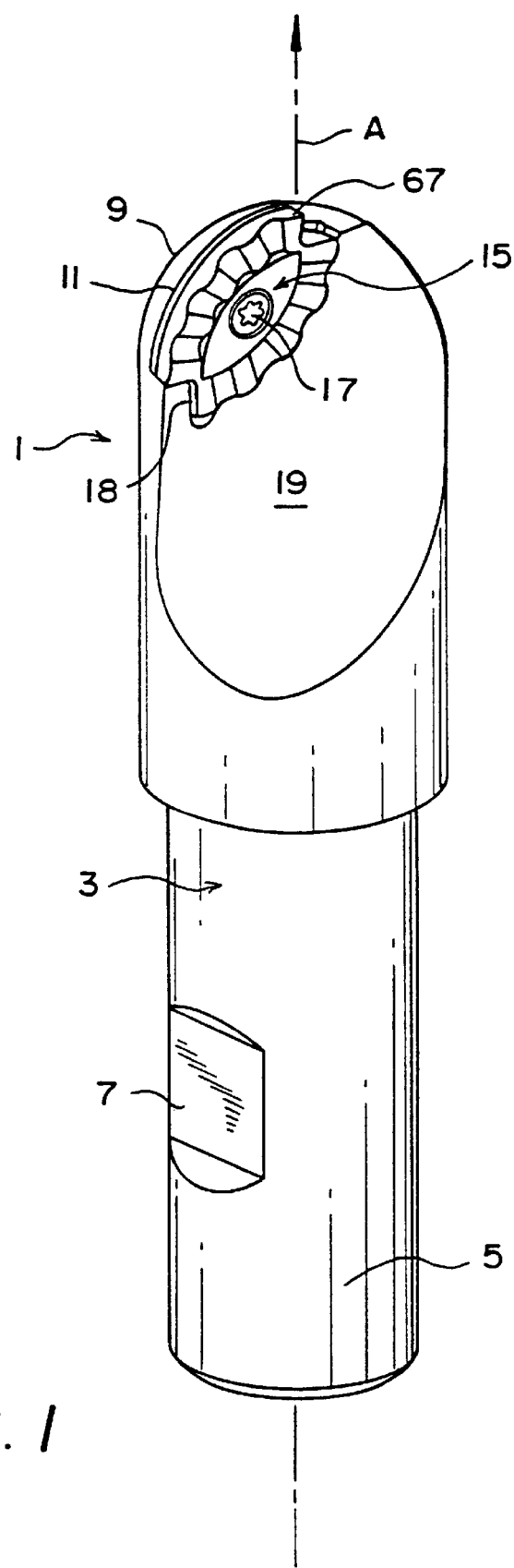
FIG. 1 is a perspective view of the insert of the invention mounted in a ball nose end mill.
Figures 2, 3:
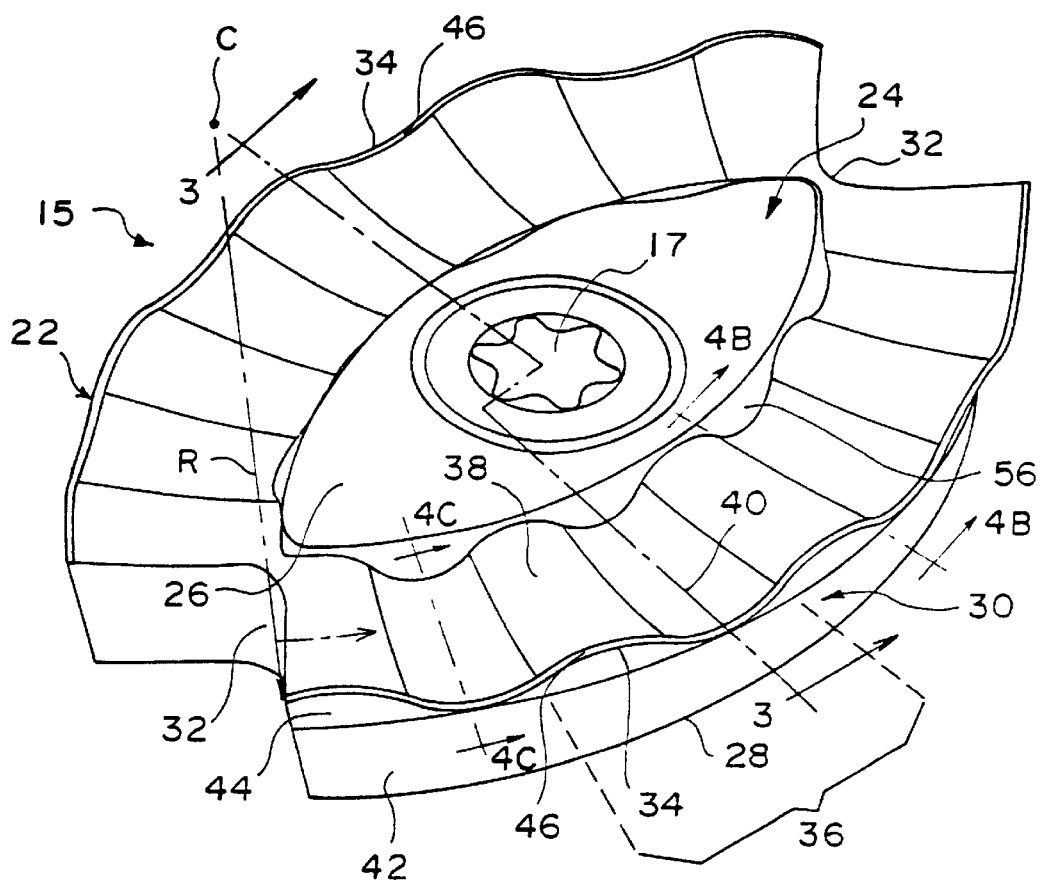
FIG. 2 is an enlarged perspective view of the insert of FIG. 1 shown without the surrounding end mill body.
FIG. 3 is a cross-sectional side view of the insert of FIG. 2 taken along the line 3—3.
Figure 4C:
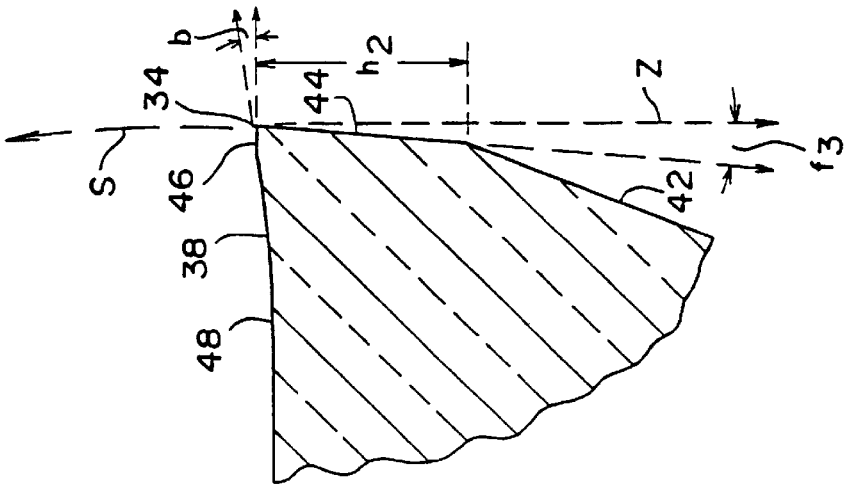
Figure 4B:
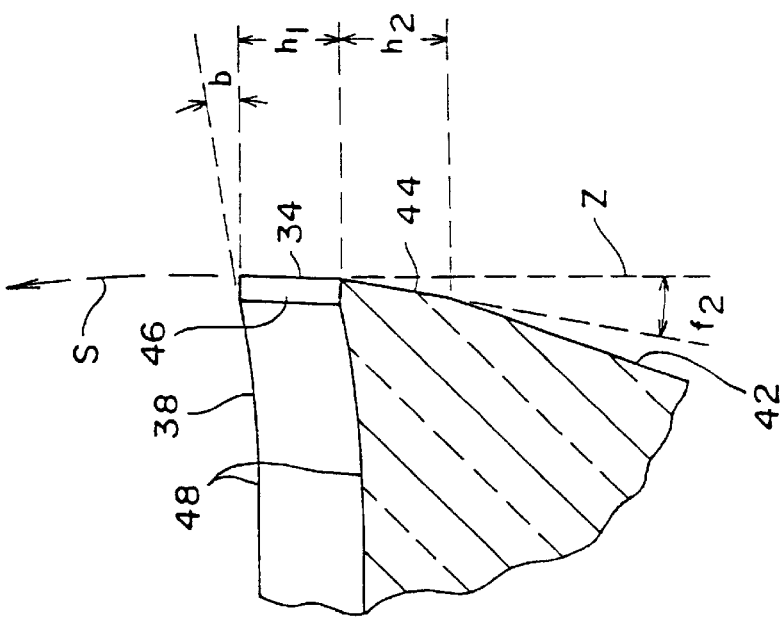
Figure 4A:
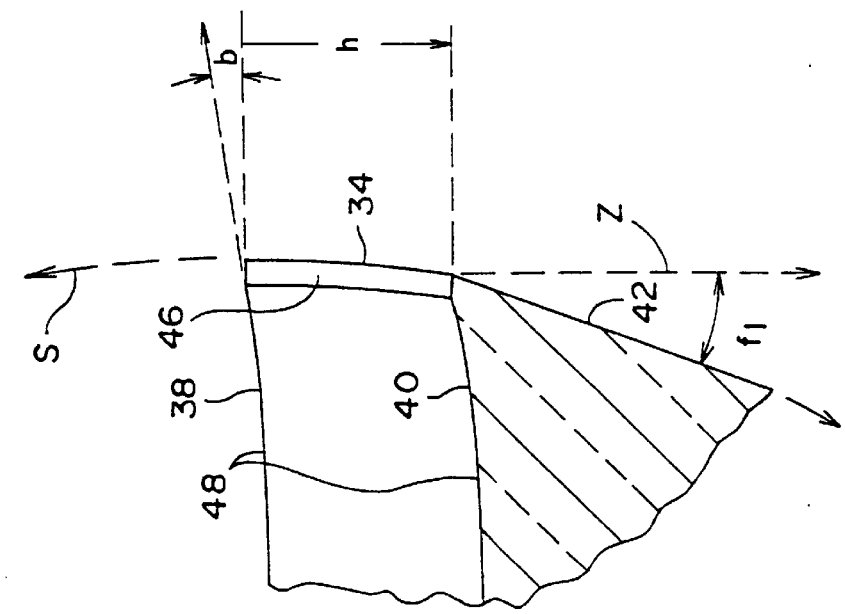

FIGS. 4A, 4B, and 4C are enlarged cross-sectional side views of the insert of FIG. 2 taken along the lines 3—3, 4B—4B, and 4C—4C, respectively;

FIG. 5 is a perspective view of the insert of FIG. 1 illustrating how the forces applied to a workpiece by the cutting edge of the insert generate a pleated chip in a fashion similar to that shown in FIG. 6, and FIG. 6 is a cut away side view of the insert and end mill illustrated in FIG. 1 performing a cutting operation on a workpiece.

DETAILED DESCRIPTION OF THE PREFERRED EMBODIMENT

With reference to FIG. 1, wherein like numerals represent like components throughout all the several figures, the invention is particularly adapted for use in a ball nose end mill 1 having an elongated body 3 that rotates about an axis A when performing a cutting operation. The end mill body 3 includes a shank portion 5 having a flat 7 which is detachably connectable to a turning tool (not shown). The end mill body 3 further includes a generally hemispherically-shaped end portion 9 having a seat 11 in the form of a recess that is complementary in shape to the cutting insert 15 of the invention. The insert 15 is secured in the seat 11 by means of a mounting screw 17. A locking shoulder 18 interfits with an end recess present the insert 15 to prevent the insert from moving rotatably with respect to the mounting screw 17.

With respect now to FIGS. 2 and 3, the insert 15 of the invention is comprised of an insert body 22 that is integrally formed from a hard, wear resistant material such as tungsten carbide, although any number of materials well known in the prior art may also be used for this purpose. The insert body 22 includes a top wall 24 having a planar portion 26, and a planar bottom wall 28. The top and bottom walls 24 and 28 are interconnected by means of a pair of opposing, arcuate sidewalls 30. The insert body 22 further includes a pair of opposing end recesses 32 that are complementary in shape to the locking shoulder 18 of the end mill body 3 for securing the insert 15 in the seat 11 as previously described.

The insert body 22 includes a pair of opposing, indexable cutting edges 34 defined at the intersection between the arcuate sidewalls 30 and the top wall 24. Each cutting edge 34 includes at least two undulations 36, and more preferably between three and five undulations, as best seen in FIG. 2. Each undulation includes a crest portion 38 and a trough portion 40, which together make up a single, sinusoidal wave. In the preferred embodiment, each of the undulations 36 has the same period and amplitude. Preferably the height h of each of the undulations 36 is no more than 40% of the maximum thickness T of the insert body 22. If the height h is much greater than 40% of the thickness T, then the insert body 22 becomes excessively weakened at the trough portions 40 of the undulations 36, which could lead to the breakage of the insert 15. On the other hand, if the height h is less than about 15% of the insert thickness T, the cutting force and vibration reducing advantages of the invention become substantially impaired. In the preferred embodiment, the height h is about 25% of the insert thickness T.

As shown in FIG. 2, each cutting edge 34 is arcuate along its length with respect to the center point C of a circle having a radius R in which the center point C is co-planar with the flat portion 26 of the top wall 24. As shown in FIG. 3, each cutting edge 34 is also arcuate along its width such that each edge 34 conforms with the wall of a sphere S having the same center point C. Such contouring advantageously allows the cutting edge 34 to make a hemispherical cut in a workpiece while utilizing the benefits provided by the undulations 36 in the edge 34.

Each of the sidewalls 30 includes a lower relief surface 42, and an upper relief surface 44. The lower relief surface 42 is preferably inclined at an angle "a" of between about 7° and 15° relative to a line disposed orthogonally with respect to the planar portion 26 of the top wall 24. A smaller angle might not insure that the cutting edge 34 can engage a workpiece without interference from the sidewall 30, while a larger angle could unduly weaken the cutting edge 34.

As is shown in FIGS. 4A through 4C, the cutting edge 34 intersects with the upper relief surface 44 as it ascends from the trough portion 40 to the crest portion 38 of the undulations 36. The upper relief surface 44 is, in effect, blended between the spherical cutting edge 34 and the lower relief surface 42 to provide a relief angle $f_1$–$f_3$ between the cutting edge 34 and the sidewall of the insert 15 while preserving the spherical profile of the edge 34. FIG. 4A illustrates the case where the cutting edge 34 intersects the trough portion 40 of the undulations 36. In this case, there is almost no upper relief surface 44, and a relatively wide relief angle $f_1$ is provided by the lower relief surface 42. However, in the case of FIG. 4B where the cutting edge 34 intersects an intermediate portion between the crest 38 and trough 40 portions, an upper relief surface 44 interconnects the bottom edge of the cutting edge 34 with the upper edge of the lower relief surface 42, and provides a relief angle $f_2$. In this figure, $h_1$ illustrates the height of the spherical cutting edge 34, while $h_2$ illustrates the height of the upper relief surface 44, where $h_1+h_2$ is equal to h. FIG. 4C illustrates the case where the cutting edge 34 intersects the crest portion 38 of an undulation 36. Here, the length $h_2$ of the upper relief surface 44 is maximized, and equals the height h of the undulations 36. As is evident in the drawings, the upper relief surface 44 continues to provide a relief angle $f_3$ to the cutting edge 34. In all cases, the relief angle is at least 3°.

With specific reference again to FIG. 3, the top wall 24 includes a narrow land 46 disposed immediately behind the cutting edge 34. The land 46 advantageously strengthens the cutting edge 34, thereby increasing the longevity of the insert 15. In the preferred embodiment, the land 46 is disposed at a rake angle "b" of between about 5° and 10° with respect to the planar portion 26 of the top surface 24. Such a positive rake angle helps to reduce cutting forces by insuring that the cutting edge 34 cuts the workpiece 66 (shown in FIG. 5) by a slicing action, as opposed to a scraping action.

Immediately disposed behind the land 46 is a chip curling groove 48. The groove 48 is essentially arcuate in cross-section, having a rounded bottom wall 50, a rounded front wall 52, and a rounded rear wall 54. The rounded rear wall 54 terminates in a straight back wall 56 that is orthogonal with respect to the planar portion 26 of the top wall 24. The front and rear walls 52, 54 of the groove 48 are disposed at angles "d" and "e" with respect to the planar portion 26 of the top wall 24, which encourages chips produced by the cutting edge 34 to curl as they slide over the top wall 24 of the insert 15. In the preferred embodiment, both angles d and e are preferably between about 20° and 30° from the plane of the top surface 24. Since these walls are arcuate, these angles are determined from a line tangential with the outer edges of the front and rear walls 52,54.

Disposed directly in the center of the insert body 22 is a bore 58 for receiving the previously-mentioned mounting screw 17. The bore 58 includes a shank portion 60 and a head portion 62 for receiving the shank and head of the mounting screw 17, respectively.

FIGS. 5 and 6 illustrate how the cutting insert 15 of the invention operates when mounted in the seat 11 at the hemispherical end portion 9 of an end mill body 3 and rotated about an axis A of rotation. A small segment 67 of the cutting edge extends over the axis of rotation A so that all portions of the rounded cut 64 are engaged by the cutting edge 34. While the amount of shear forces and heat generated in the vicinity of the edge segment 67 are higher than in other parts of the edge 34 due to the fact that the rotational speed of the edge is zero at this point, the undulations 36 reduce the shear forces and the heat by lowering the cutting forces all along the edge 34, and by further reducing the vibration associated with the cutting operation. These advantageous reductions in cutting forces, heat, and vibration result from the fact that the cutting edge 34 does not initially cut the workpiece 66 simultaneously along the same line. Instead, the crest portion 38 of the undulations 36 form leading portions of the cutting edge that engage the workpiece 66 first, while the trough portions 40 provide trailing portions of the edge 34. Additionally, these undulations 36 advantageously produce metal chips 68 having embrittling pleats 70 therein. As is shown in FIG. 5, such pleating is caused by the fact that the crest portion 38 of each undulation 36 tends to spread the chip outwardly during the cutting operation, thereby creating a thinned portion 71, while the trough portion 40 of each undulation 36 tends to create compressed portion 72 in the chip 68. The generation of such pleats 70 with alternately thinned and compressed portions 71 and 72, in combination with the curling forces applied to the chips 68 as a result of the positive rake angle of the land 46 and the provision of the chip curling groove 48, effectively embrittle even very fine chips, which in turn allows them to be broken up and easily expelled out of the flute 19 present in the hemispherical end portion 9 of the end mill body 3.

While this invention has been described with respect to a specific embodiment, various additions, modifications, and variations of this invention will become evident to persons skilled in the art. All such modifications, additions, and variations are within the scope of this invention, which is limited only by the claims appended hereto.

What is claimed is:

1. An insert for use in a ball nose end mill for making a rounded cut in a workpiece by removing chips therefrom when rotated about an axis, comprising:

an insert body including a top wall, a bottom wall, an arcuate side wall, and an arcuate cutting edge defined at an intersection between said top and side walls, a portion of said top wall including a plurality of sinusoidal undulations extending to said arcuate cutting edge for reducing cutting forces, reducing vibration, and enhancing the breaking and removal of chips from a workpiece.

2. The insert described in claim 1, wherein an end portion of the cutting edge of said insert crosses an axis of rotation of a toolholder holding said insert therein, and said sinusoidal undulations reduce shear forces on said insert end portion during a cutting operation.

3. The insert described in claim 1, wherein said side wall of said insert body includes a lower relief portion, and an upper relief portion disposed between said lower relief portion and said cutting edge, and the cutting edge including a profile following the contour of a sphere for preventing the generation of tool marks.

4. The insert described in claim 3, wherein said upper relief portion includes a profile providing a relief angle.

5. The insert described in claim 4, wherein said relief angle is at least 3°.

6. The insert described in claim 4, wherein said top wall includes a planar portion, and said lower relief portion of said side wall is inclined at a relief angle of between about 5° and 15° with respect to a plane orthogonal to said planar portion.

7. The insert described in claim 1, wherein said top wall further includes a land portion disposed behind said cutting edge for strengthening said edge.

8. The insert described in claim 7, wherein said top wall includes a planar portion, and said land portion is inclined between 5° and 10° with respect to said planar portion of said top wall to impart a positive rake angle to said edge.

9. The insert described in claim 7, wherein said top wall includes a chip curling groove behind said land portion.

10. The insert described in claim 9, wherein said groove includes a bottom wall, and front and rear walls that are inclined between 15° and 30° with respect to the planar portion of said top wall.

11. The insert described in claim 10, wherein said groove further includes a back wall that intersects with said rear wall and which is orthogonal with respect to said planar portion of said top wall.

12. An insert for use in a ball nose end mill for making a rounded cut in a workpiece by removing chips therefrom when rotated about an axis, comprising:

an insert body including a top wall, a bottom wall, an arcuate side wall, and an arcuate cutting edge defined at an intersection between said top and side walls, a portion of said top wall including a plurality of sinusoidal undulations extending to and being a part of said arcuate cutting edge for reducing cutting forces and vibration and enhancing the breaking and removal of chips, each undulation including a crest portion and a trough portion, said edge having at least two undulations having the same period and amplitude.

13. The insert described in claim 12, wherein a height difference between the crest and trough portions of each of said undulations is between about 20% and 35% of a maximum thickness of the insert.

14. The insert described in claim 12, wherein an end portion of the cutting edge of said insert crosses an axis of rotation of a toolholder holding said insert, and said sinusoidal undulations reduce shear forces on said insert end portion during a cutting operation.

15. The insert described in claim 12, wherein said side wall of said insert body includes a lower relief portion, and an upper relief portion disposed between said lower relief portion and said cutting edge, and said cutting edge follows the contour of a sphere for preventing the generation of unwanted tool marks.

16. The insert described in claim 15, wherein said upper relief portion includes a profile providing a relief angle.

17. The insert described in claim 16, wherein said relief angle is at least 3°.

18. An insert for use in a ball nose end mill for making a rounded cut in a workpiece by removing chips therefrom when rotated about an axis, comprising:

an insert body including a top wall, a bottom wall, an arcuate sidewall having a lower relief portion and an upper relief portion, and an arcuate cutting edge defined at an intersection between said top wall and said upper relief portion of said side wall, said cutting edge including a plurality of sinusoidal undulations for reducing cutting forces and vibration and enhancing the breaking and removal of chips, each undulation including a crest portion and a trough portion, said edge having at least two undulations having the same period and amplitude, wherein the cutting edge includes a profile following the contour of a sphere.

19. The insert described in claim 18, wherein said insert includes two opposing arcuate cutting edges, and is indexable.

* * * * *